US010165580B2

United States Patent
Lee et al.

(10) Patent No.: US 10,165,580 B2
(45) Date of Patent: Dec. 25, 2018

(54) METHOD FOR PROHIBITING FROM TRIGGERING SCHEDULING REQUEST IN A D2D COMMUNICATION SYSTEM AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 15/507,627

(22) PCT Filed: Jul. 27, 2015

(86) PCT No.: PCT/KR2015/007810
§ 371 (c)(1),
(2) Date: Feb. 28, 2017

(87) PCT Pub. No.: WO2016/068454
PCT Pub. Date: May 6, 2016

(65) Prior Publication Data
US 2017/0290028 A1    Oct. 5, 2017

Related U.S. Application Data

(60) Provisional application No. 62/072,446, filed on Oct. 30, 2014.

(51) Int. Cl.
*H04W 28/02*    (2009.01)
*H04W 72/12*    (2009.01)
*H04W 72/14*    (2009.01)

(52) U.S. Cl.
CPC .......... *H04W 72/12* (2013.01); *H04W 28/02* (2013.01); *H04W 72/1278* (2013.01); *H04W 72/14* (2013.01); *H04W 72/121* (2013.01)

(58) Field of Classification Search
None
See application file for complete search history.

(56) References Cited

U.S. PATENT DOCUMENTS

2014/0036885 A1    2/2014  Moberg et al.
2014/0056278 A1*   2/2014  Marinier ............. H04W 72/044
                                                          370/330
(Continued)

OTHER PUBLICATIONS

Catt, "D2D Communication Resource Allocation Mode 1," 3GPP TSG RAN WG2 Meeting #85bis, R2-141195, Valencia, Spain, Mar. 31-Apr. 4, 2014 (Mar. 22, 2014), pp. 1-4.

(Continued)

*Primary Examiner* — Yaotang Wang
(74) *Attorney, Agent, or Firm* — Birch, Stewart, Kolasch & Birch, LLP

(57) ABSTRACT

The present invention relates to a wireless communication system. More specifically, the present invention relates to a method and a device for prohibiting from triggering scheduling request in a D2D communication system, the method comprising: configuring that the UE belongs to one or more ProSe groups; receiving, from a network, a Scheduling Request (SR) prohibit indication indicating at least one of the one or more ProSe groups; triggering a sidelink BSR for a first ProSe group of the one or more ProSe groups when a sidelink BSR trigger condition is met; and triggering a SR if the SR prohibit indication doesn't indicate the first ProSe group.

20 Claims, 13 Drawing Sheets

(56) References Cited

U.S. PATENT DOCUMENTS

| 2016/0044678 A1* | 2/2016 | Kwon | H04W 76/14 370/329 |
| 2016/0044737 A1* | 2/2016 | Kwon | H04W 76/14 370/328 |
| 2016/0081108 A1* | 3/2016 | Tseng | H04W 72/1242 370/329 |
| 2017/0195822 A1* | 7/2017 | Watfa | H04W 4/005 |

OTHER PUBLICATIONS

Ericsson, "Introduction of ProSe (including ProSe BSR triggers)," 3GPP TSG-RAN WG2 Meeting #87, R2-143577, Change Request, Current Version 12.1.0, Dresden, Germany, Aug. 18-22, 2014 (Aug. 8, 2014), pp. 1-61.

LG Electronics, "Issues on Scheduling Request for D2D Communication," 3GPP TSG-RAN WG2 #87, R2-143543, Dresden, Germany, Aug. 18-22, 2014 (Aug. 8, 2014), pp. 1-2.

Panasonic, "SR Issues for D2D Communication," 3GPP TSG RAN WG2 Meeting #87, R2-143298, Dresden, Germany, Aug. 18-22, 2014 (Aug. 8, 2014), pp. 1-2.

\* cited by examiner

[Fig. 1]
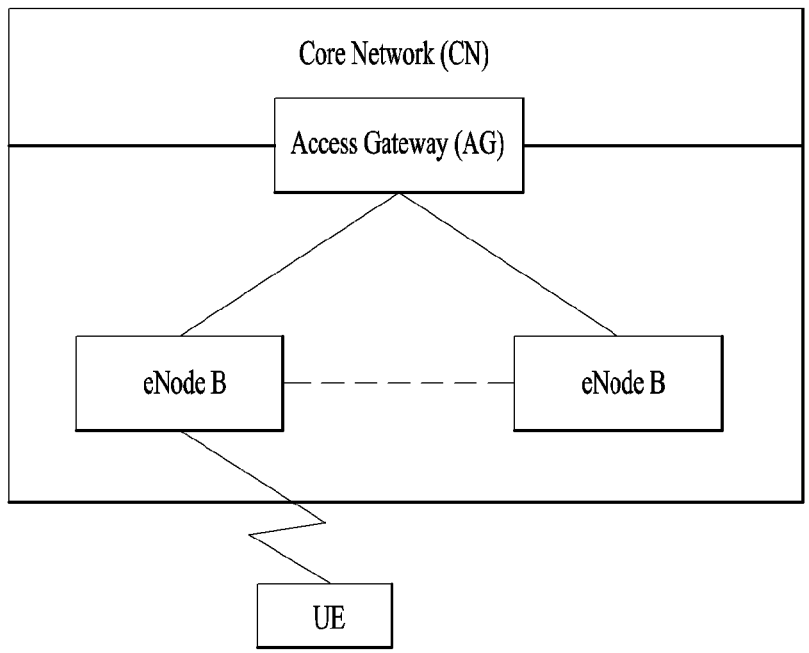
[Fig. 2a]
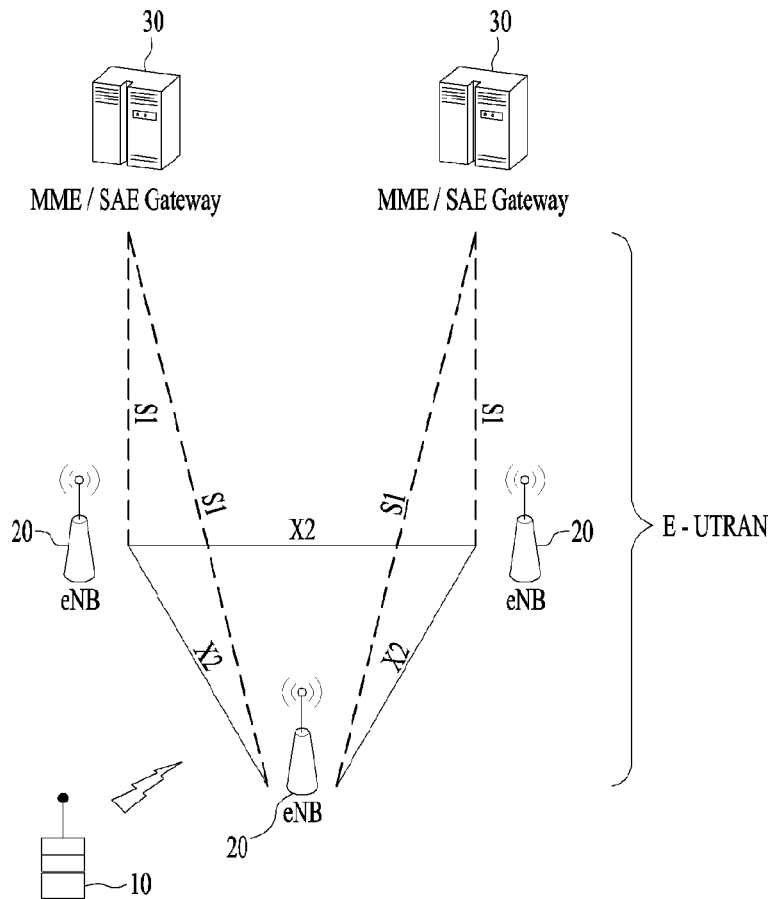

[Fig. 2b]
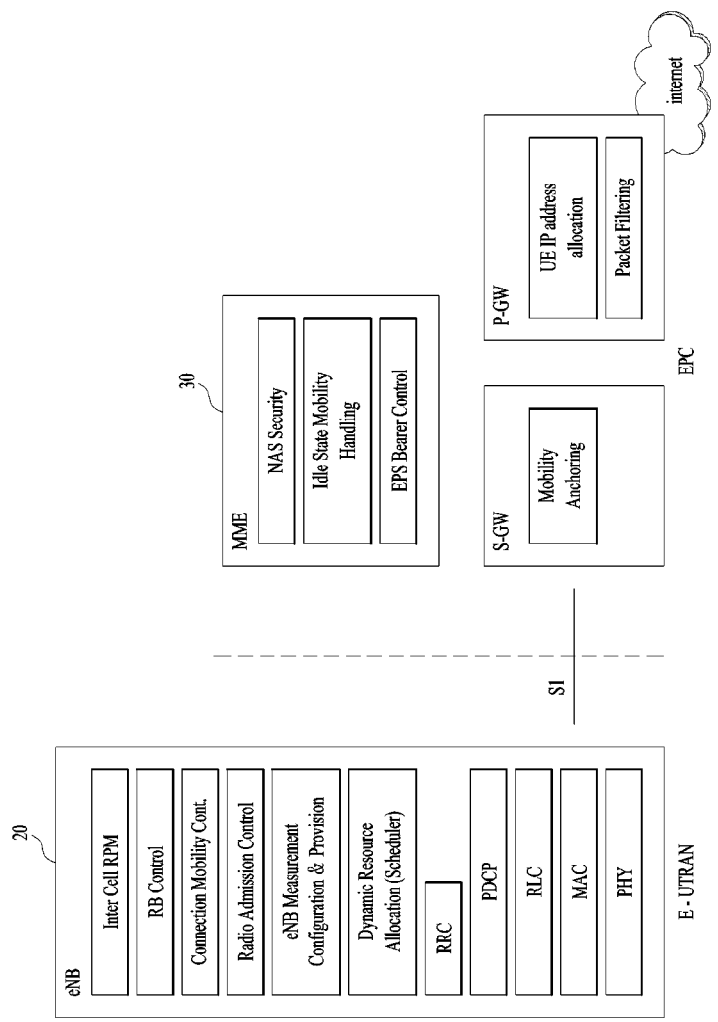

[Fig. 3]
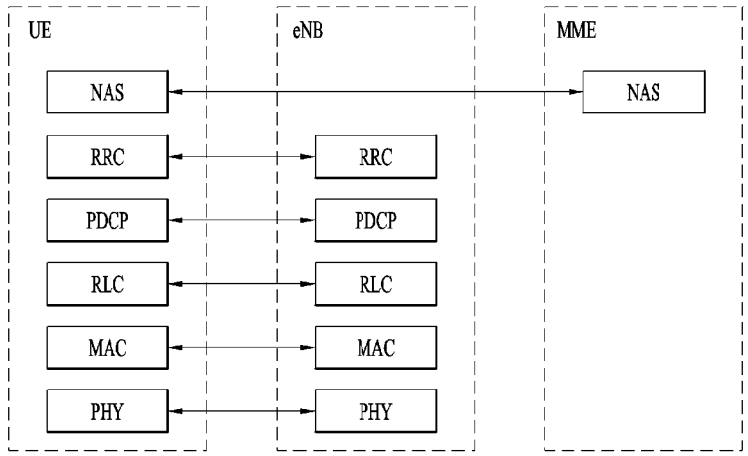
(a) Control-Plane Protocol Stack
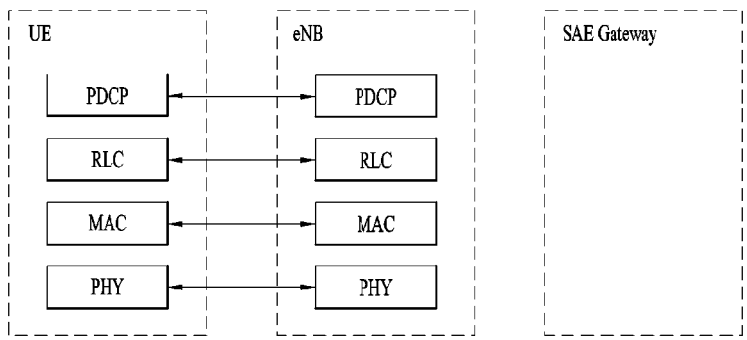
(b) User-Plane Protocol Stack
[Fig. 4]
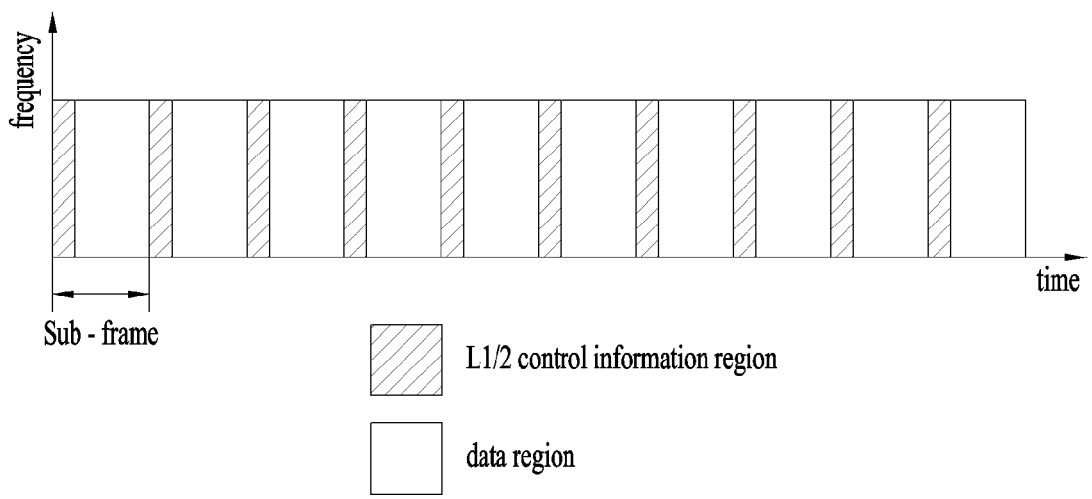

[Fig. 5]
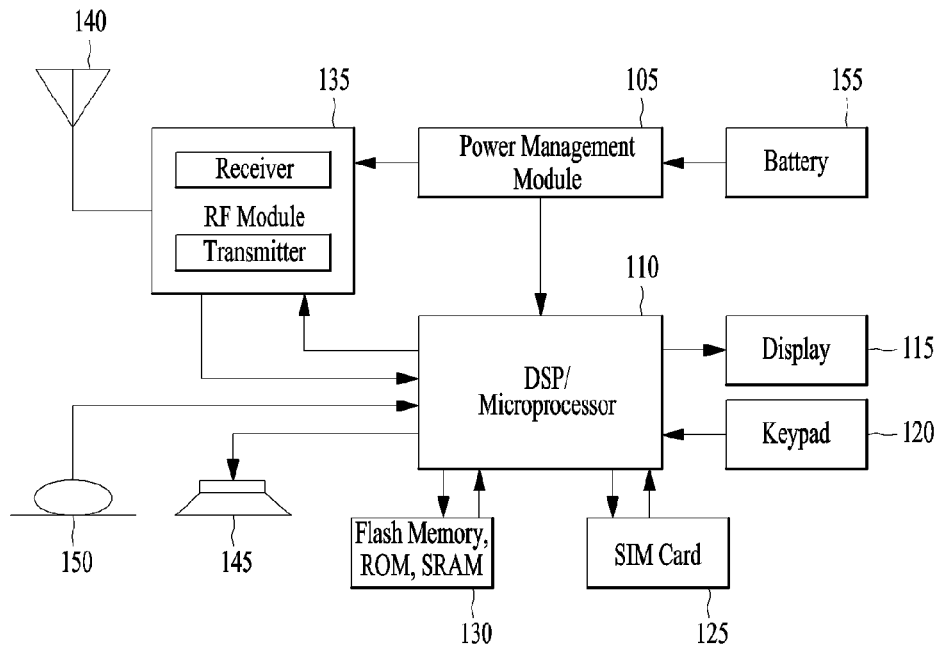
[Fig. 6]
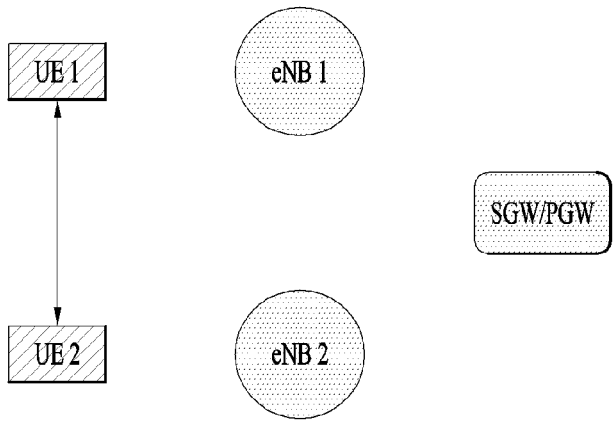
[Fig. 7]
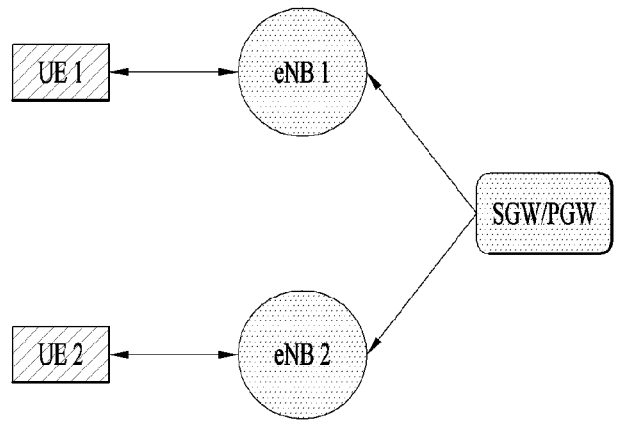

[Fig. 8]
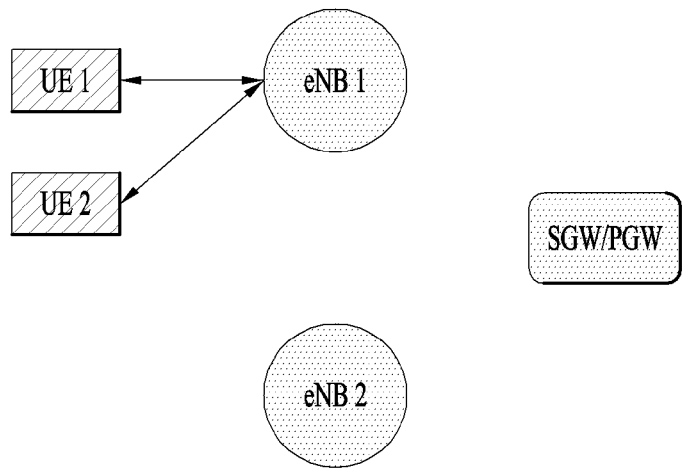
[Fig. 9]
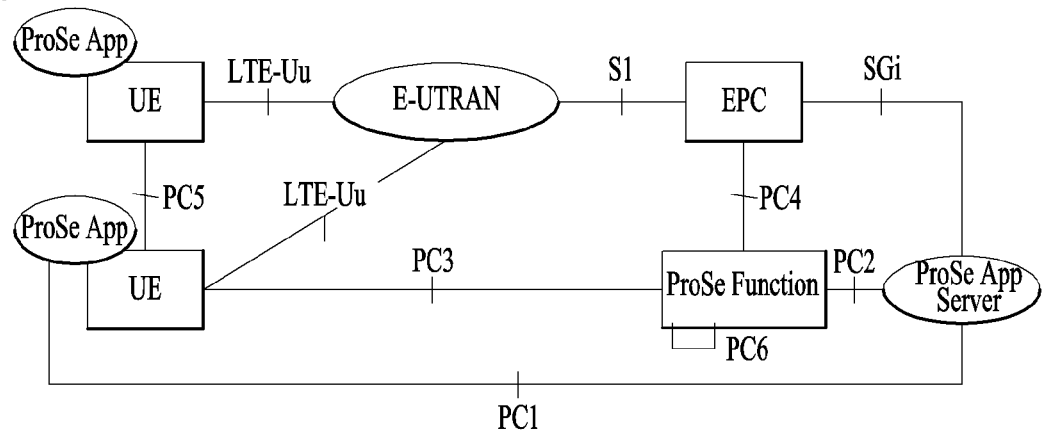

[Fig. 10]
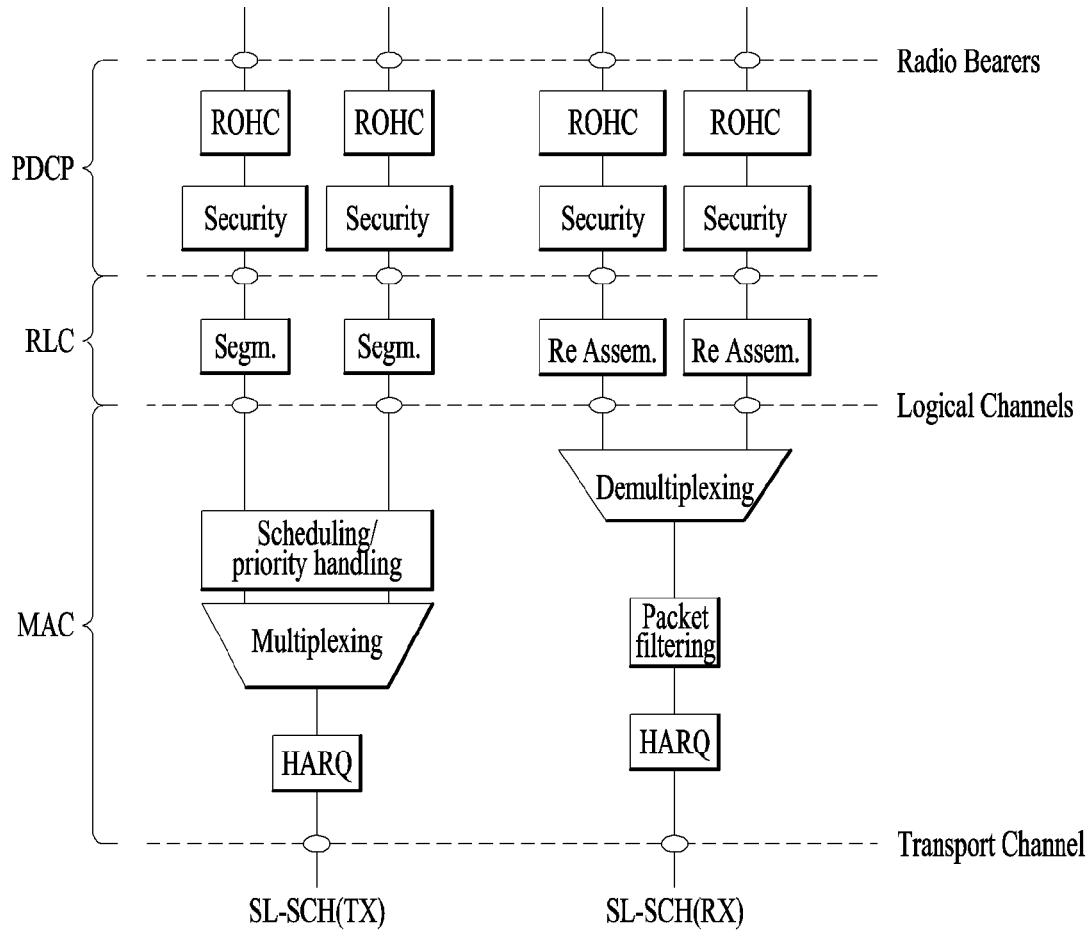
[Fig. 11a]
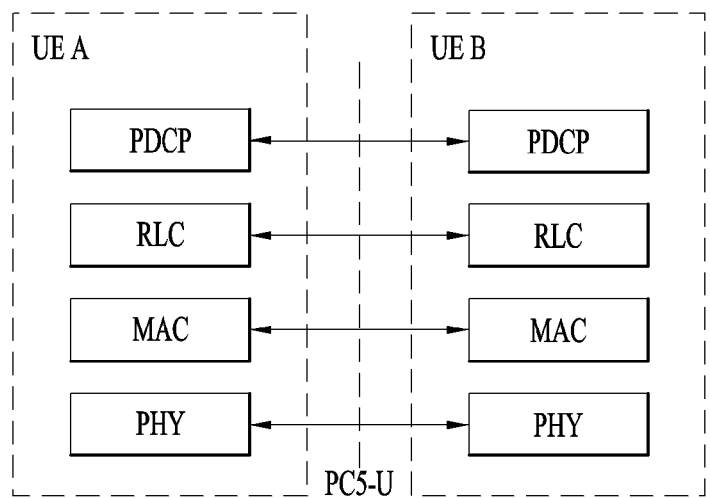

[Fig. 11b]
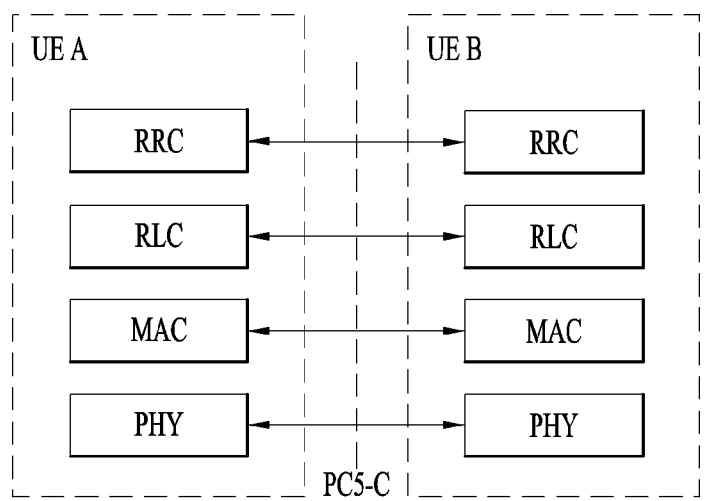
[Fig. 12]
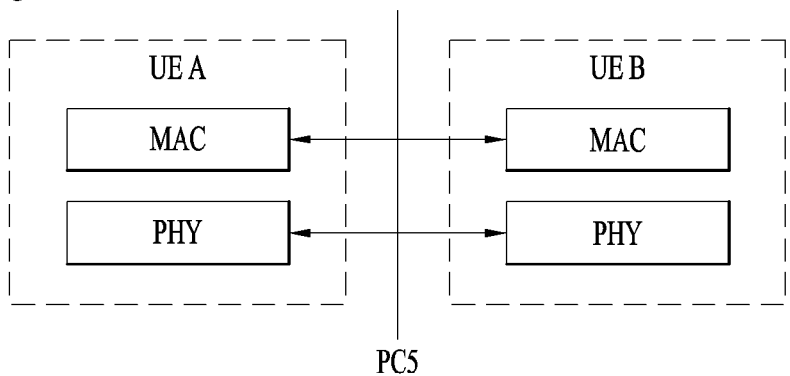

[Fig. 13]
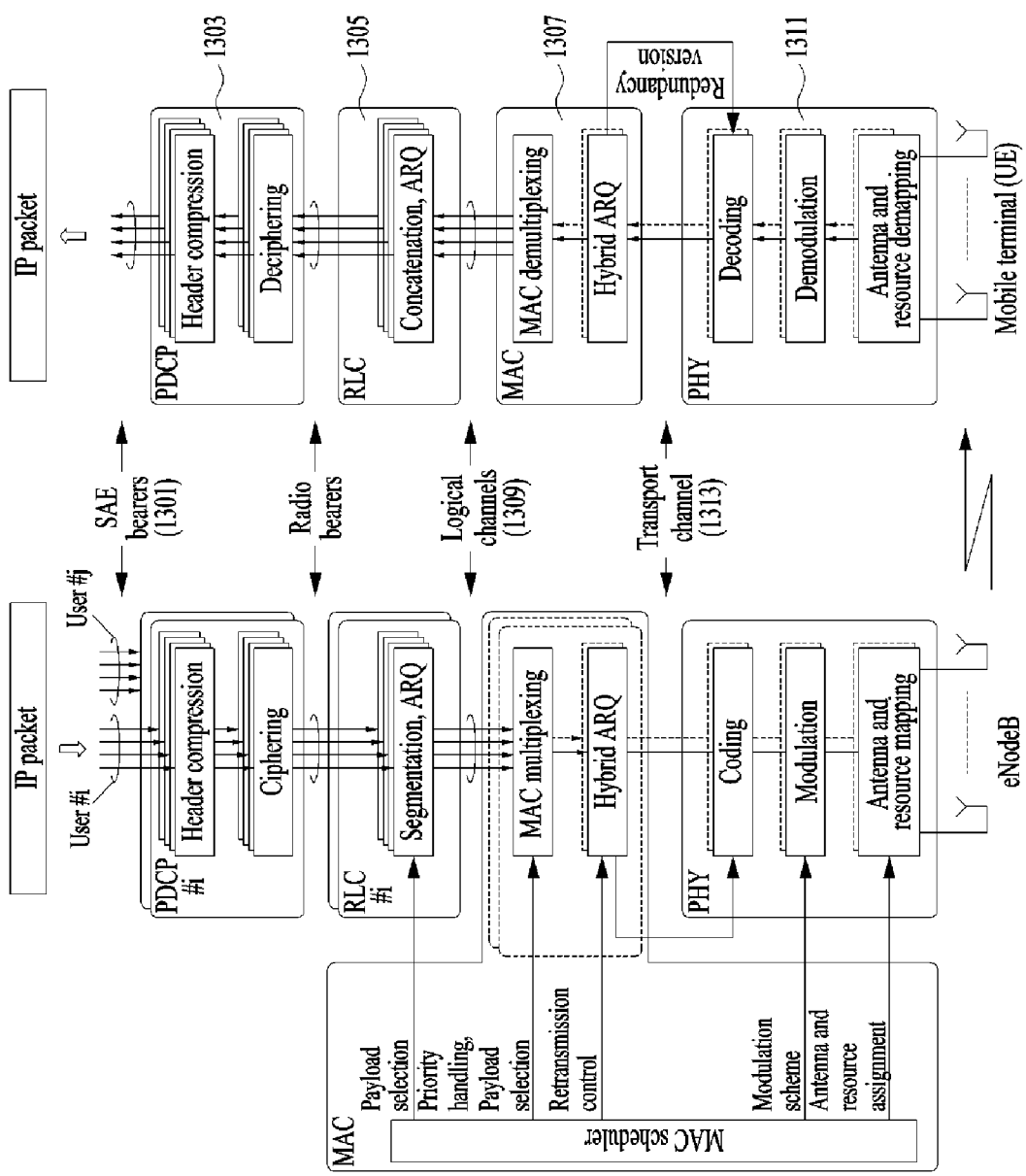

[Fig. 14]
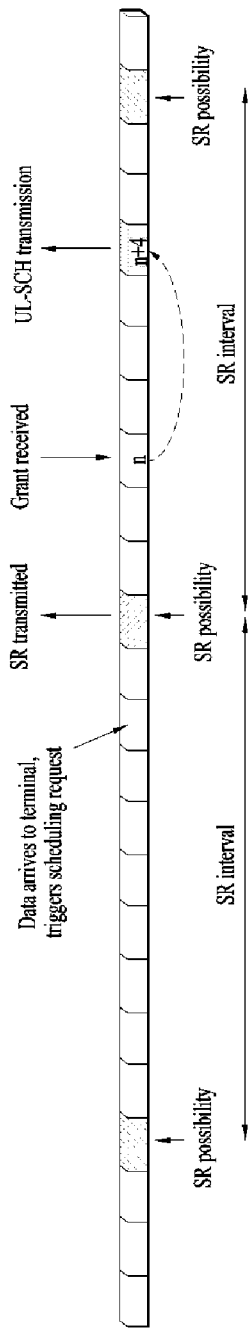

[Fig. 15]
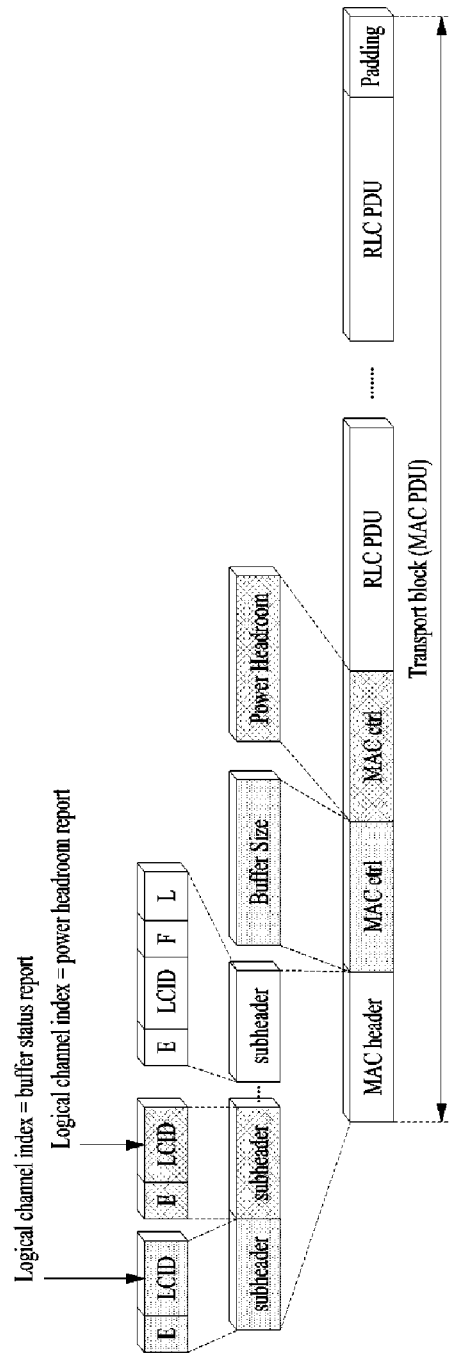

[Fig. 16]
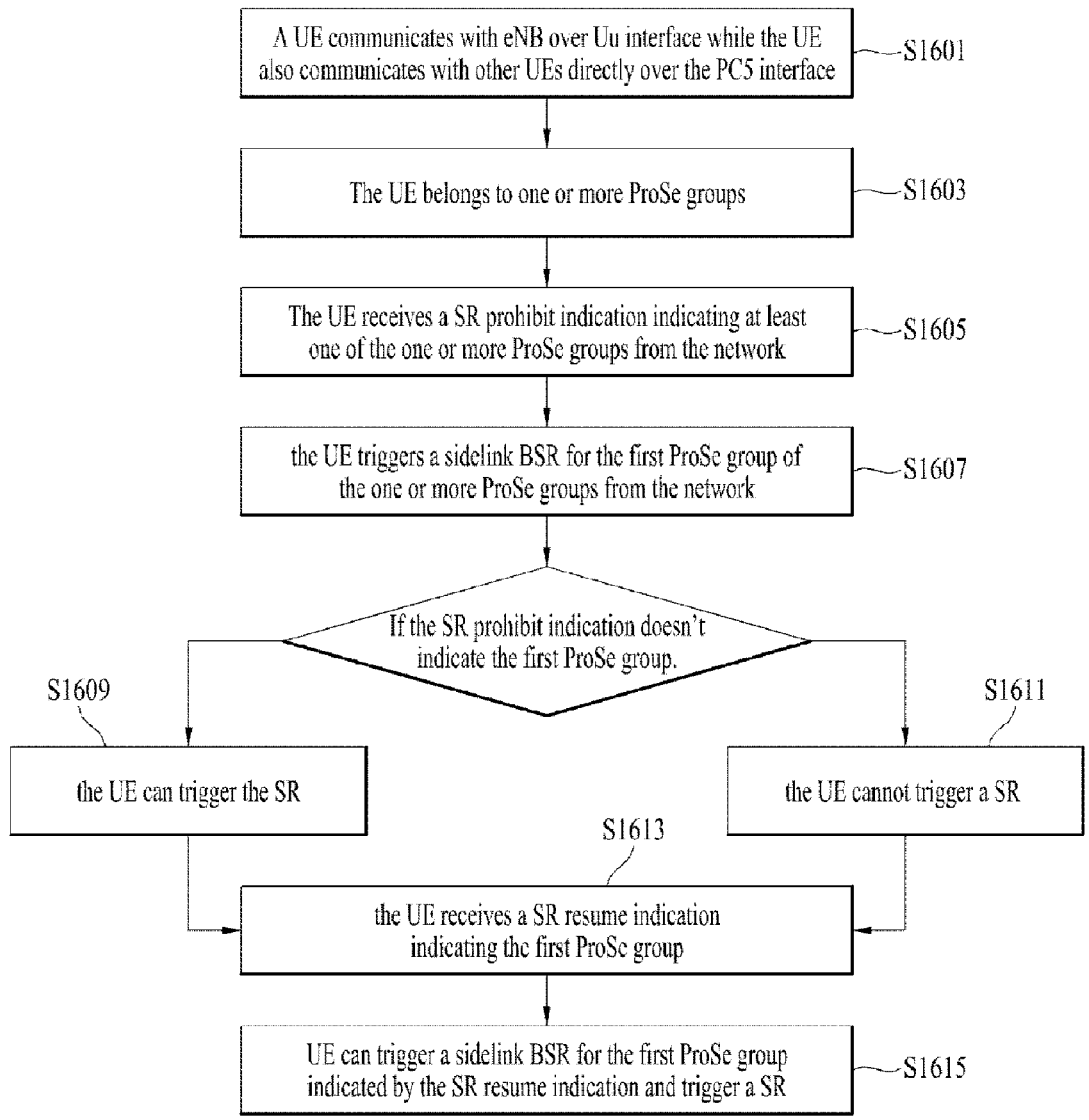

[Fig. 17]
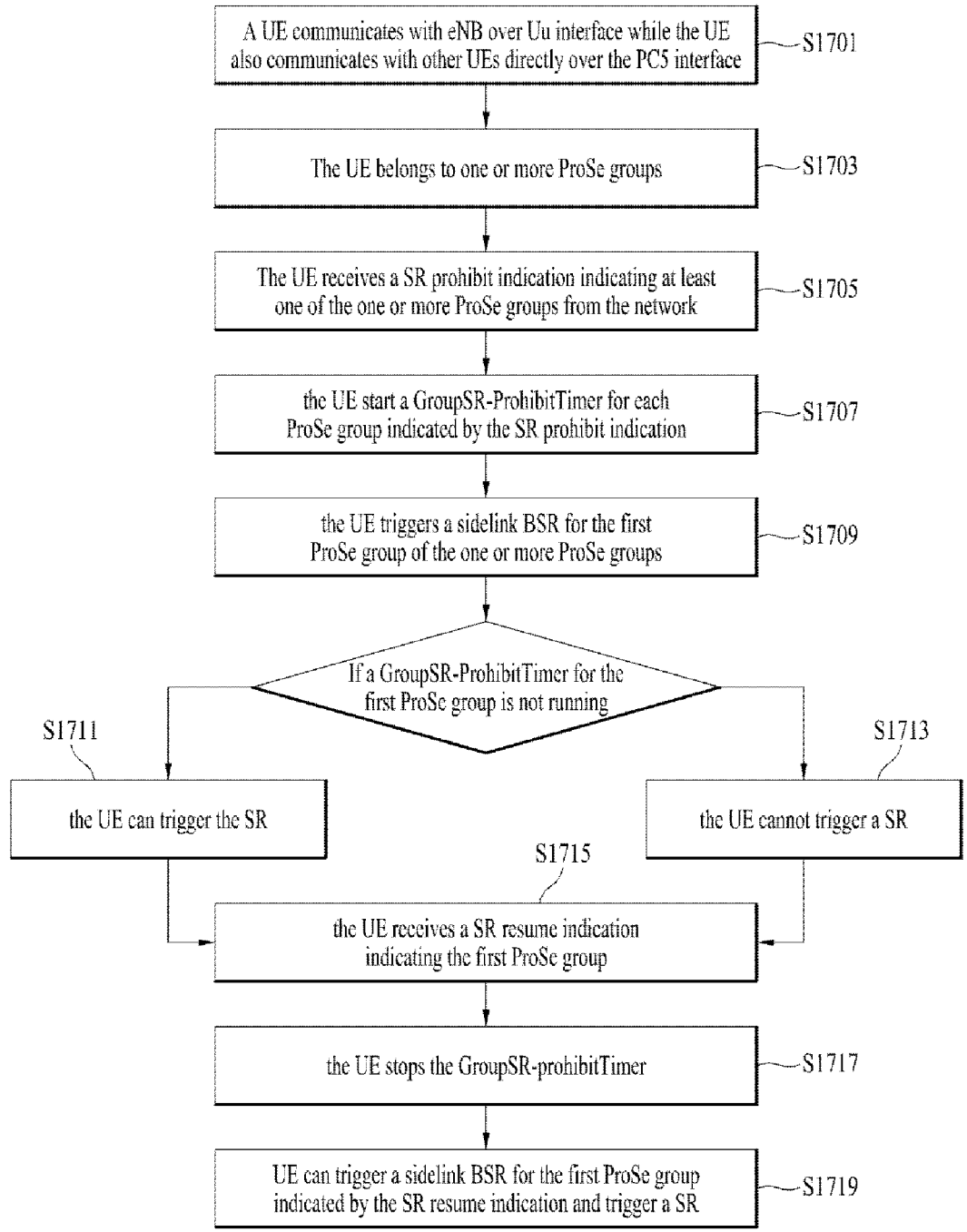

[Fig. 18]
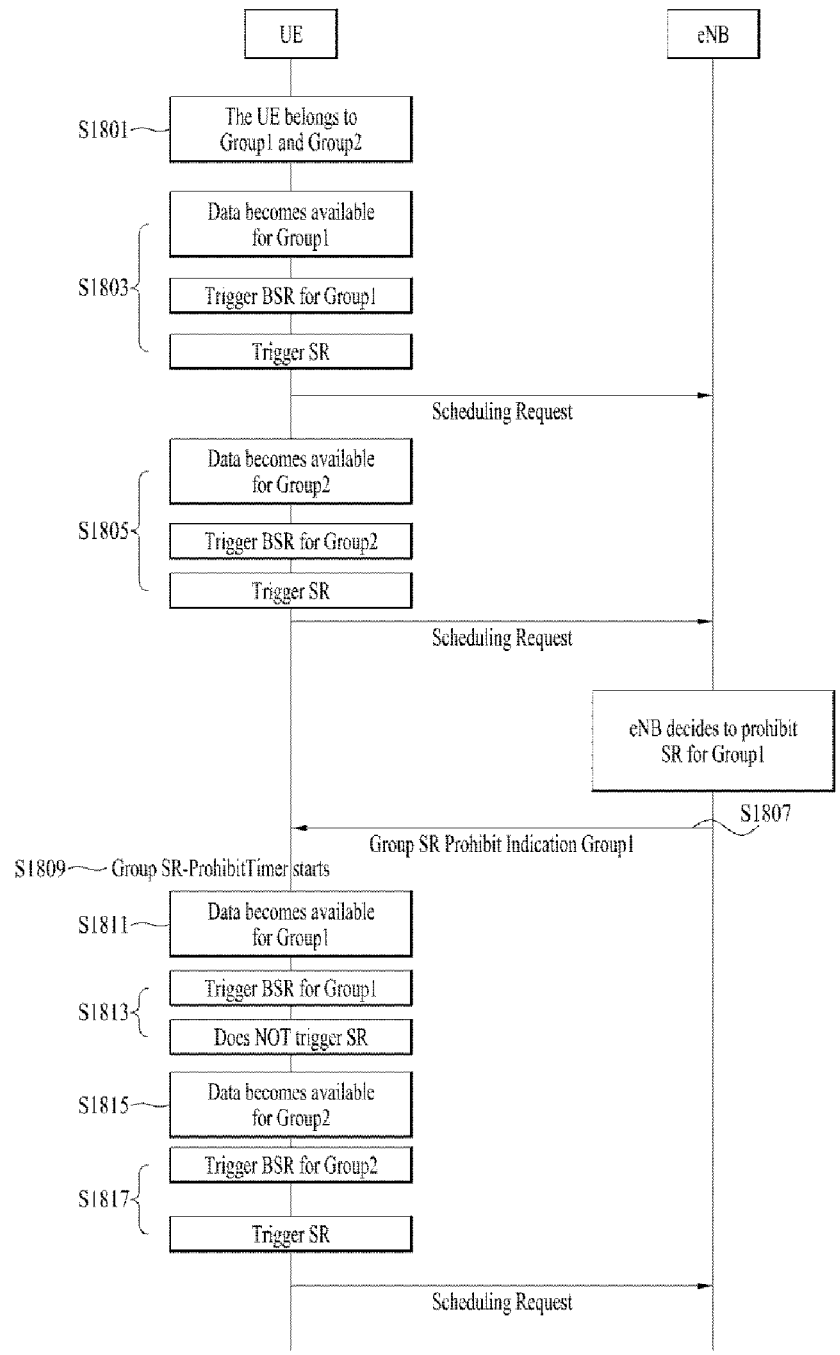

METHOD FOR PROHIBITING FROM TRIGGERING SCHEDULING REQUEST IN A D2D COMMUNICATION SYSTEM AND DEVICE THEREFOR

CROSS REFERENCE TO RELATED APPLICATIONS

This application is the National Phase of PCT International Application No. PCT/KR2015/007810, filed on Jul. 27, 2015, which claims priority under 35 U.S.C. 119(e) to U.S. Provisional Application No. 62/072,446, filed on Oct. 30, 2014, all of which are hereby expressly incorporated by reference into the present application.

TECHNICAL FIELD

The present invention relates to a wireless communication system and, more particularly, to a method for prohibiting from triggering scheduling request in a D2D (Device to Device) communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE OF INVENTION

Technical Problem

An object of the present invention devised to solve the problem lies in a method and device for a method for prohibiting from triggering scheduling request in a D2D communication system. The technical problems solved by the present invention are not limited to the above technical problems and those skilled in the art may understand other technical problems from the following description.

Solution to Problem

The object of the present invention can be achieved by providing a method for operating by an apparatus in wireless communication system, the method comprising; configuring that the UE belongs to one or more ProSe groups; receiving, from a network, a Scheduling Request (SR) prohibit indication indicating at least one of the one or more ProSe groups; triggering a sidelink BSR for a first ProSe group of the one or more ProSe groups when a sidelink BSR trigger condition is met; and triggering a SR if the SR prohibit indication doesn't indicate the first ProSe group.

Preferably, the first ProSe group is defined as at least one of: a set of logical channels with a same target identified by a group identifier; or a set of logical channels with a same target identified by a destination identifier; or a set of logical channels with a same source identified by a source identifier and a same target identified by a destination identifier; or a set of logical channels with a group index which is mapped to a same group identifier.

Preferably, the method further comprises: transmitting, to the network, a list of the one or more ProSe groups to which the UE belongs, wherein the list of the one or more ProSe groups to which the UE belongs includes an UE identifier, a group identifier, destination identifier, or group index which identifies the first ProSe group.

Preferably, when the UE receives a SR prohibit indication indicating the first ProSe group, the UE considers that Buffer Status Report (BSR) triggered in the first ProSe group does not trigger an SR; or the UE considers that SR not pending even though the SR is triggered and not cancelled if the SR is triggered by the BSR in the first ProSe group.

Preferably, the SR is not trigged if the SR prohibit indication indicates the first ProSe group.

Preferably, the method further comprises: receiving, from the network, a SR resume indication indicating the first ProSe group; triggering a sidelink BSR for the first ProSe group indicated by the SR resume indication when a sidelink BSR trigger condition is met; and triggering a SR.

In another aspect of the present invention provided herein is a method for operating by an apparatus in wireless communication system, the method comprising: configuring that the UE belongs to one or more ProSe groups; receiving, from a network, a Scheduling Request (SR) prohibit indication indicating at least one of the one or more ProSe group; starting a prohibit timer for each ProSe group indicated by the SR prohibit indication; triggering a sidelink BSR for a first ProSe group of the one or more ProSe groups when a sidelink BSR trigger condition is met; and triggering a SR if a prohibit timer for the first ProSe group is not running.

Preferably, the SR is not trigged if the prohibit timer for the first ProSe group is running.

Preferably, the SR prohibit indication includes an UE identifier, a group identifier, destination identifier, or group index which identifies the first ProSe group, and value of the prohibit timer.

Preferably, the prohibit timer can be pre-defined for the UE and the network.

Preferably, the prohibit timer is a period of time duration, wherein the period of time duration defines a number of subframes, a certain time duration, or a number of SR trigger.

Preferably, the method further comprises: receiving, from the network, a SR resume indication indicating the first ProSe group; and stopping the prohibit timer for the first ProSe group.

Preferably, the method further comprises: if the prohibit timer expires, triggering a sidelink BSR for a first ProSe group of the one or more ProSe groups when the sidelink BSR trigger condition is met.

Preferably, if the prohibit timer expires, when the SR is triggered by the sidelink BSR in the first ProSe group, the UE considers that the SR is pending until when the SR is cancelled if the SR is triggered by the sidelink BSR in the first ProSe group.

It is to be understood that both the foregoing general description and the following detailed description of the present invention are exemplary and explanatory and are intended to provide further explanation of the invention as claimed.

Advantageous Effects of Invention

According to the present invention, triggering scheduling request is prohibited in a D2D communication system under a certain condition.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a diagram of an example physical channel structure used in an E-UMTS system;

FIG. 5 is a block diagram of a communication apparatus according to an embodiment of the present invention;

FIG. 6 is an example of default data path for a normal communication;

FIGS. 7 and 8 are examples of data path scenarios for a proximity communication;

FIG. 9 is a conceptual diagram illustrating for a non-roaming reference architecture;

FIG. 10 is a conceptual diagram illustrating for a Layer 2 Structure for Sidelink;

FIG. 11a is a conceptual diagram illustrating for User-Plane protocol stack for ProSe Direct Communication, and FIG. 11b is Control-Plane protocol stack for ProSe Direct Communication;

FIG. 12 is a conceptual diagram illustrating for a PC5 interface for ProSe Direct Discovery;

FIG. 13 is a diagram for a general overview of the LTE protocol architecture for the downlink;

FIG. 14 is a diagram for Scheduling-request transmission;

FIG. 15 is a diagram for signaling of buffer status and power-headroom reports;

FIGS. 16 and 17 are diagrams for prohibiting from triggering scheduling request in a D2D communication system according to embodiments of the present invention; and FIG. 18 is an example for prohibiting from triggering scheduling request in a D2D communication system according to embodiments of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer?s choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

FIG. 9 is a conceptual diagram illustrating for a non-roaming reference architecture.

PC1 to PC 5 represent interfaces. PC1 is a reference point between a ProSe application in a UE and a ProSe App server.

It is used to define application level signaling requirements. PC 2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE.

The functionality may include but not restricted to e.g.:
Interworking via a reference point towards the 3rd party Applications
Authorization and configuration of the UE for discovery and Direct communication
Enable the functionality of the EPC level ProSe discovery
ProSe related new subscriber data and/handling of data storage; also handling of ProSe identities;
Security related functionality
Provide Control towards the EPC for policy related functionality
Provide functionality for charging (via or outside of EPC, e.g. offline charging)

Especially, the following identities are used for ProSe Direct Communication:
Source Layer-2 ID identifies a sender of a D2D packet at PC5 interface. The Source Layer-2 ID is used for identification of the receiver RLC UM entity;
Destination Layer-2 ID identifies a target of the D2D packet at PC5 interface. The Destination Layer-2 ID is used for filtering of packets at the MAC layer. The Destination Layer-2 ID may be a broadcast, groupcast or unicast identifier; and
SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels. E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Physical-layer processing: the Sidelink physical layer processing of transport channels differs from UL transmission in the following steps:
i) Scrambling: for PSDCH and PSCCH, the scrambling is not UE-specific;
ii) Modulation: 64 QAM is not supported for Sidelink Physical Sidelink control channel: PSCCH is mapped to the Sidelink control resources. PSCCH indicates resource and other transmission parameters used by a UE for PSSCH.

Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.

Physical channel procedure: for in-coverage operation, the power spectral density of the sidelink transmissions can be influenced by the eNB.

FIG. 11a is a conceptual diagram illustrating for User-Plane protocol stack for ProSe Direct Communication, and FIG. 11b is Control-Plane protocol stack for ProSe Direct Communication.

FIG. 11a shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11a.

User plane details of ProSe Direct Communication: i) MAC sub header contains LCIDs (to differentiate multiple logical channels), ii) The MAC header comprises a Source Layer-2 ID and a Destination Layer-2 ID, iii) At MAC Multiplexing/demultiplexing, priority handling and padding are useful for ProSe Direct communication, iv) RLC UM is used for ProSe Direct communication, v) Segmentation and reassembly of RLC SDUs are performed, vi) A receiving UE needs to maintain at least one RLC UM entity per transmitting peer UE, vii) An RLC UM receiver entity does not need to be configured prior to reception of the first RLC UM data unit, and viii) U-Mode is used for header compression in PDCP for ProSe Direct Communication.

FIG. 11b shows the protocol stack for the control plane, where RRC, RLC, MAC, and PHY sublayers (terminate at the other UE) perform the functions listed for the control plane. A D2D UE does not establish and maintain a logical connection to receiving D2D UEs prior to a D2D communication.

FIG. 12 is a conceptual diagram illustrating for a PC5 interface for ProSe Direct Discovery.

ProSe Direct Discovery is defined as the procedure used by the ProSe-enabled UE to discover other ProSe-enabled UE(s) in its proximity using E-UTRA direct radio signals via PC5.

Radio Protocol Stack (AS) for ProSe Direct Discovery is shown in FIG. 12.

The AS layer performs the following functions:
Interfaces with upper layer (ProSe Protocol): The MAC layer receives the discovery information from the upper layer (ProSe Protocol). The IP layer is not used for transmitting the discovery information.
Scheduling: The MAC layer determines the radio resource to be used for announcing the discovery information received from upper layer.
Discovery PDU generation: The MAC layer builds the MAC PDU carrying the discovery information and sends the MAC PDU to the physical layer for transmission in the determined radio resource. No MAC header is added.

There are two types of resource allocation for discovery information announcement.
Type 1: A resource allocation procedure where resources for announcing of discovery information are allocated on a non UE specific basis, further characterized by: i) The eNB provides the UE(s) with the resource pool configuration used for announcing of discovery information. The configuration may be signalled in SIB, ii) The UE autonomously selects radio resource(s) from the indicated resource pool and announce discovery information, iii) The UE can announce discovery information on a randomly selected discovery resource during each discovery period.
Type 2: A resource allocation procedure where resources for announcing of discovery information are allocated on a per UE specific basis, further characterized by: i) The UE in RRC_CONNECTED may request resource(s) for announcing of discovery information from the eNB via RRC, ii) The eNB assigns resource(s) via RRC, iii) The resources are allocated within the resource pool that is configured in UEs for monitoring.

For UEs in RRC_IDLE, the eNB may select one of the following options:
The eNB may provide a Type 1 resource pool for discovery information announcement in SIB. UEs that are authorized for Prose Direct Discovery use these resources for announcing discovery information in RRC_IDLE.
The eNB may indicate in SIB that it supports D2D but does not provide resources for discovery information announcement. UEs need to enter RRC Connected in order to request D2D resources for discovery information announcement.

For UEs in RRC_CONNECTED,
A UE authorized to perform ProSe Direct Discovery announcement indicates to the eNB that it wants to perform D2D discovery announcement.
The eNB validates whether the UE is authorized for ProSe Direct Discovery announcement using the UE context received from MME.
The eNB may configure the UE to use a Type 1 resource pool or dedicated Type 2 resources for discovery information announcement via dedicated RRC signaling (or no resource).
The resources allocated by the eNB are valid until a) the eNB de-configures the resource(s) by RRC signaling or b) the UE enters IDLE. (FFS whether resources may remain valid even in IDLE).

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

FIG. 13 is a diagram for a general overview of the LTE protocol architecture for the downlink.

A general overview of the LTE protocol architecture for the downlink is illustrated in FIG. 13. Furthermore, the LTE protocol structure related to uplink transmissions is similar to the downlink structure in FIG. 13, although there are differences with respect to transport format selection and multi-antenna transmission.

Data to be transmitted in the downlink enters in the form of IP packets on one of the SAE bearers (1301). Prior to transmission over the radio interface, incoming IP packets are passed through multiple protocol entities, summarized below and described in more detail in the following sections:
Packet Data Convergence Protocol (PDCP, 1303) performs IP header compression to reduce the number of bits necessary to transmit over the radio interface. The header-compression mechanism is based on ROHC, a standardized header-compression algorithm used in WCDMA as well as several other mobile-communication standards. PDCP (1303) is also responsible for ciphering and integrity protection of the transmitted data. At the receiver side, the PDCP protocol performs the corresponding deciphering and decompression operations. There is one PDCP entity per radio bearer configured for a mobile terminal.
Radio Link Control (RLC, 1305) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (1305) offers services to the PDCP (1303) in the form of radio bearers. There is one RLC entity per radio bearer configured for a terminal.

There is one RLC entity per logical channel configured for a terminal, where each RLC entity is responsible for: i) segmentation, concatenation, and reassembly of RLC SDUs; ii) RLC retransmission; and iii) in-sequence delivery and duplicate detection for the corresponding logical channel.

Other noteworthy features of the RLC are: (1) the handling of varying PDU sizes; and (2) the possibility for close interaction between the hybrid-ARQ and RLC protocols. Finally, the fact that there is one RLC entity per logical channel and one hybrid-ARQ entity per component carrier implies that one RLC entity may interact with multiple hybrid-ARQ entities in the case of carrier aggregation.

The purpose of the segmentation and concatenation mechanism is to generate RLC PDUs of appropriate size from the incoming RLC SDUs. One possibility would be to define a fixed PDU size, a size that would result in a compromise. If the size were too large, it would not be possible to support the lowest data rates. Also, excessive padding would be required in some scenarios. A single small PDU size, however, would result in a high overhead from the header included with each PDU. To avoid these drawbacks, which is especially important given the very large dynamic range of data rates supported by LTE, the RLC PDU size varies dynamically.

In process of segmentation and concatenation of RLC SDUs into RLC PDUs, a header includes, among other fields, a sequence number, which is used by the reordering and retransmission mechanisms. The reassembly function at the receiver side performs the reverse operation to reassemble the SDUs from the received PDUs.

Medium Access Control (MAC, 1307) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (1307) offers services to the RLC (1305) in the form of logical channels (1309).

Physical Layer (PHY, 1311), handles coding/decoding, modulation/demodulation, multi-antenna mapping, and other typical physical layer functions. The physical layer (1311) offers services to the MAC layer (1307) in the form of transport channels (1313).

FIG. 14 is a diagram for Scheduling-request transmission.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

A scheduling request is a simple flag, raised by the terminal to request uplink resources from the uplink scheduler. Since the terminal requesting resources by definition has no PUSCH resource, the scheduling request is transmitted on the PUCCH. Each terminal can be assigned a dedicated PUCCH scheduling request resource, occurring every nth subframe. With a dedicated scheduling-request mechanism, there is no need to provide the identity of the terminal requesting to be scheduled as the identity of the terminal is implicitly known from the resources upon which the request is transmitted.

When data with higher priority than already existing in the transmit buffers arrives at the terminal and the terminal has no grant and hence cannot transmit the data, the terminal transmits a scheduling request at the next possible instant, as illustrated in FIG. 15. Upon reception of the request, the scheduler can assign a grant to the terminal. If the terminal does not receive a scheduling grant until the next possible scheduling-request instant, then the scheduling request is repeated. There is only a single scheduling-request bit, irrespective of the number of uplink component carriers the terminal is capable of. In the case of carrier aggregation, the scheduling request is transmitted on the primary component carrier, in line with the general principle of PUCCH transmission on the primary component carrier only.

The use of a single bit for the scheduling request is motivated by the desire to keep the uplink overhead small, as a multi-bit scheduling request would come at a higher cost. A consequence of the single-bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed below. Knowledge of the service type may also be used ? for example, in the case of voice the uplink resource to grant is preferably the size of a typical voice-over-IP package. The scheduler may also exploit, for example, path-loss measurements used for mobility and handover decisions to estimate the amount of resources the terminal may efficiently utilize.

An alternative to a dedicated scheduling-request mechanism would be a contention-based design. In such a design, multiple terminals share a common resource and provide their identity as part of the request. This is similar to the design of the random access.

The number of bits transmitted from a terminal as part of a request would in this case be larger, with the correspondingly larger need for resources. In contrast, the resources are shared by multiple users. Basically, contention-based designs are suitable for a situation where there are a large number of terminals in the cell and the traffic intensity, and hence the scheduling intensity, is low. In situations with higher intensities, the collision rate between different terminals simultaneously requesting resources would be too high and lead to an inefficient design.

Although the scheduling-request design for LTE relies on dedicated resources, a terminal that has not been allocated such resources obviously cannot transmit a scheduling request. Instead, terminals without scheduling-request resources configured rely on the random-access mechanism. In principle, an LTE terminal can therefore be configured to rely on a contention-based mechanism if this is advantageous in a specific deployment.

The Scheduling Request (SR) is used for requesting UL-SCH resources for new transmission. When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR, or when the UL grant(s) can accommodate all pending data available for transmission.

If an SR is triggered and there is no other SR pending, the UE may set the SR_COUNTER to 0.

As long as one SR is pending, if no UL-SCH resources are available for a transmission in this TTI, the UE may initiate a Random Access procedure on a PCell and cancel all pending SRs if the UE has no valid PUCCH resource for SR configured in any TTI.

Else if the UE has a valid PUCCH resource for SR configured for this TTI and if this TTI is not part of a measurement gap and if sr-ProhibitTimer is not running, if SR_COUNTER<dsr-TransMax, the UE may increment SR_COUNTER by 1, instruct the physical layer to signal the SR on PUCCH, and start the sr-ProhibitTimer.

if SR_COUNTER≥dsr-TransMax, the UE may notify RRC to release PUCCH/SRS for all serving cells, clear any configured downlink assignments and uplink grants, and initiate a Random Access procedure on the PCell and cancel all pending SRs.

FIG. 15 is a diagram for signaling of buffer status and power-headroom reports.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report, as illustrated in FIG. 15.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data awaiting transmission across all logical channels in a logical-channel group. A buffer status report represents one or all four logical-channel groups and can be triggered for the following reasons:

i) Arrival of data with higher priority than currently in the transmission buffer ? that is, data in a logical-channel group with higher priority than the one currently being transmitted ? as this may impact the scheduling decision.

ii) Change of serving cell, in which case a buffer-status report is useful to provide the new serving cell with information about the situation in the terminal.

iii) Periodically as controlled by a timer.

iv) Instead of padding. If the amount of padding required to match the scheduled transport block size is larger than a buffer-status report, a buffer-status report is inserted. Clearly it is better to exploit the available payload for useful scheduling information instead of padding if possible.

The Buffer Status Reporting (BSR) procedure is used to provide a serving eNB with information about the amount of data available for transmission (DAT) in the UL buffers of the UE. RRC may control BSR reporting by configuring the two timers periodicBSR-Timer and retxBSR-Timer and by, for each logical channel, optionally signalling Logical Channel Group which allocates the logical channel to an LCG (Logical Channel Group).

For the Buffer Status reporting procedure, the UE may consider all radio bearers which are not suspended and may consider radio bearers which are suspended. A Buffer Status Report (BSR) may be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

For Regular and Periodic BSR, if more than one LCG has data available for transmission in the TTI where the BSR is transmitted, the UE may report Long BSR. If else, the UE may report Short BSR.

If the Buffer Status reporting procedure determines that at least one BSR has been triggered and not cancelled, if the UE has UL resources allocated for new transmission for this TTI, the UE may instruct the Multiplexing and Assembly procedure to generate the BSR MAC control element(s), start or restart periodicBSR-Timer except when all the generated BSRs are Truncated BSRs, and start or restart retxBSR-Timer.

Else if a Regular BSR has been triggered, if an uplink grant is not configured or the Regular BSR was not triggered due to data becoming available for transmission for a logical channel for which logical channel SR masking (logicalChannelSR-Mask) is setup by upper layers, a Scheduling Request shall be triggered.

An RRC message including "logicalChannelSR-Mask" can control SR triggering on a logical channel basis when an uplink grant is configured.

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

In summary, the BSR is triggered in any of the following situation:

i) when data arrive for a logical channel which has higher priority than the logical channels whose buffers are not empty;

ii) when data become available for the UE's buffer, which is empty;

iii) when the retxBSR-Timer expires and there is still data in the UE's buffer;

iv) when a periodicBSR-Timer expires; or v) when the remaining space in a MAC PDU can accommodate a BSR.

In the prior art, SR masking is used for prohibiting the UE triggers Scheduling Request for a logical channel. As the eNB is responsible for configuring all logical channels, prohibiting SR trigger is realized by configuring a logical channel with logicalChannelSR-Mask by the eNB. In UE side, when a Regular BSR is triggered, if the BSR is triggered not due to the data becoming available for transmission for a logical channel for which logical channel SR masking (logicalChannelSR-Mask), the UE triggers SR.

In ProSe communication, a UE has at least one sidelink logical channel through which a TX UE can transmit data to an RX UE over PC5 interface. Different from the logical channel through which a UE transmit/receive data to/from an eNB over Uu interface, the TX UE by itself can configure the logical channel. In this case, the eNB may not be able to configure SR masking for the concerned logical channel, even though the BSR/SR is still sent to the eNB from the UE. Accordingly, the eNB cannot prohibit SR for the concerned logical channel so that random access may occur frequently.

FIG. 16 is a diagram for prohibiting from triggering scheduling request in a D2D communication system according to embodiments of the present invention.

In this invention, the UE is prohibited from triggering/transmitting the SR of at least one ProSe group by receiving a SR prohibit indication from the network. The UE resumes triggering/transmitting SR of the ProSe group either after a period of time duration or upon receiving a SR resume indication from the network.

A UE communicates with eNB over Uu interface while the UE also communicates with other UEs directly over the PC5 interface (S1601). The UE is configured with at least one sidelink logical channel over which the UE transmits/receive SL data directly to/from other UE. And the UE has a buffer for SL data transmission.

The UE belongs to one or more ProSe groups (S1603).

Preferably, the ProSe group is defined as below: i) a set of logical channels with a same target, which is identified by a Group Identifier, ii) a set of logical channels with a same target, which is identified by a Destination Identifier, iii) a set of logical channels with a same source, which is identified by a Source Identifier, and a same target, which is identified by a Destination Identifier, or iv) a set of logical channels with the Group Index which is mapped to a same Group Identifier, e.g., Logical Channel Group ID can be used as the Group Index.

When the UE belongs to at least one ProSe group, the UE informs a network of the Group list by transmitting PHY/MAC/RRC signaling including: i) an UE identifier; or ii) a Group identifier, a Destination identifier, or a Group Index which identifies the Group.

The UE receives a Scheduling Request (SR) prohibit indication indicating at least one of the one or more ProSe groups from the network (S1605).

When the network transmits the SR prohibit indication to the UE by PHY/MAC/RRC signaling including: i) an UE identifier; or ii) a Group identifier, a Destination identifier, or a Group Index which identifies the Group; or iii) GroupSR-ProhibitTimer.

When the sidelink BSR trigger condition for a first ProSe group is met, the UE triggers a sidelink BSR for the first ProSe group of the one or more ProSe groups (S1607).

A sidelink Buffer Status Report (BSR) shall be triggered if any of the following events occur:

If the MAC entity has a configured SL-RNTI, i) SL data, for a sidelink logical channel of a ProSe Destination, becomes available for transmission in the RLC entity or in the PDCP entity and there is currently no data available for transmission for any of the sidelink logical channels belonging to the same ProSe Destination, in which case the Sidelink BSR is referred below to as "Regular Sidelink BSR", ii) UL resources are allocated and number of padding bits remaining after a Padding BSR has been triggered is equal to or larger than the size of the Sidelink BSR MAC control element containing the buffer status for at least one ProSe Destination plus its subheader, in which case the Sidelink BSR is referred below to as "Padding Sidelink BSR", iii) retxBSR-TimerSL expires and the MAC entity has data available for transmission for any of the sidelink logical channels, in which case the Sidelink BSR is referred below to as "Regular Sidelink BSR", iv) periodic-BSR-TimerSL expires, in which case the Sidelink BSR is referred below to as "Periodic Sidelink BSR".

If the MAC entity doesn't have a configured SL-RNTI, An SL-RNTI is configured by upper layers and SL data is available for transmission in the RLC entity or in the PDCP entity, in which case the Sidelink BSR is referred below to as "Regular Sidelink BSR".

If the SR prohibit indication doesn't indicate the first ProSe group, the UE can trigger a SR (S1609). Else if the SR prohibit indication indicates the first ProSe group, the UE cannot trigger the SR (S1611).

When the SR prohibit indication indicates the first ProSe group, the UE considers that BSR triggered in the first ProSe group does not trigger an SR, or the UE considers that SR not pending even though the SR is triggered and not cancelled if the SR is triggered by the BSR in the first ProSe group.

When the UE receives a SR resume indication indicating the first ProSe group by PHY/MAC/RRC signaling (S1613), the UE can trigger a sidelink BSR for the first ProSe group indicated by the SR resume indication when a sidelink BSR trigger condition is met and trigger a SR (S1615).

When the SR resume indication indicates the first ProSe group, the UE considers that BSR triggered in the first ProSe group can trigger an SR; or the UE considers that SR is pending until when SR is cancelled if the SR is triggered by the BSR in the first ProSe group.

Preferably, the SR resume indication includes i) an UE identifier; or ii) a Group identifier, a Destination identifier, or a Group Index which identifies the Group.

FIG. 17 is a diagram for prohibiting from triggering scheduling request in a D2D communication system according to embodiments of the present invention.

As mentioned above, the SR prohibit indication includes GroupSR-ProhibitTimer.

Preferably, the GroupSR-prohibitTimer can be pre-defined for the UE and the network.

Preferably, GroupSR-ProhibitTimer is a period of time duration and defined as follows: i) the number of subframes, e.g., 10 subframes, or ii) a certain time duration, e.g., 10 ms or, iii) the number of SR trigger, e.g., 10 times.

When the UE receives the SR prohibit indication indicating at least one of the one or more ProSe groups from the network (S1705), the UE start a GroupSR-ProhibitTimer for each ProSe group indicated by the SR prohibit indication (S1707) if the GroupSR-prohibitTimer is not running. If the GroupSR-prohibitTimer is running, the UE restart the GroupSR-prohibitTimer.

When the sidelink BSR trigger condition for a first ProSe group is met, the UE triggers a sidelink BSR for the first ProSe group of the one or more ProSe groups (S1709).

If a GroupSR-ProhibitTimer for the first ProSe group is not running, the UE can trigger a SR (S1711). Else if the GroupSR-ProhibitTimer for the first ProSe group is running, the UE cannot trigger a SR (S1713).

If the GroupSR-ProhibitTimer for the first ProSe group expires, the UE considers that BSR triggered in the first ProSe group can trigger an SR, and the UE considers that SR is pending until when SR is cancelled if the SR is triggered by the BSR in first ProSe group.

When the UE receives a SR resume indication indicating the first ProSe group by PHY/MAC/RRC signaling (S1715), if the GroupSR-prohibitTimer is running, the UE stops the GroupSR-prohibitTimer (S1717).

And The UE can trigger a sidelink BSR for the first ProSe group indicated by the SR resume indication when a sidelink BSR trigger condition is met and trigger a SR (S1719).

FIG. 18 is an example for prohibiting from triggering scheduling request in a D2D communication system according to embodiments of the present invention.

The UE belongs to a ProSe group 1 and ProSe group 2 (S1801). When data becomes available for the ProSe group 1, the UE triggers BSR for ProSe group 1 and SR also. The UE transmits the triggered SR (S1803).

Meanwhile, when data becomes available for the ProSe group 2, the UE triggers BSR for ProSe group 2 and SR also. The UE transmits the triggered SR (S1805).

When the eNB transmits to the UE a SR prohibit indicator indicating the ProSe group 1 (S1807), the UE starts a GroupSR-prohibitTimer for the ProSe group 1 (S1809).

And then, if another data becomes available for the ProSe group 1 again (S1811), the UE triggers BSR and the UE checks whether the SR is triggered by a BSR if the SR trigger condition is met.

Because the SR is triggered by the BSR, which is triggered by the data for a logical channel which belongs to the ProSe group 1, which is indicated by the Group SR Prohibit Indicator and not indicated by the Group SR Resume Indicator, or of which the GroupSR-prohibitTimer is running, the UE does not trigger SR (S1813).

When another data available for the ProSe group 2 again (S1815), the UE triggers BSR and the UE checks whether the SR is triggered by a BSR if the SR trigger condition is met.

Because the SR is triggered by the BSR, which is not triggered by the data for a logical channel which belongs to the ProSe group 1, which is indicated by the Group SR Prohibit Indicator and not indicated by the Group SR Resume Indicator, or of which the GroupSR-prohibitTimer is running, the UE triggers SR. And the UE transmits the triggered SR (S1817).

On the other hand, if the SR is triggered, the UE can check whether the SR is triggered by a BSR, wherein the BSR is triggered by the data for a logical channel which belongs to the ProSe group 1, which is indicated by the Group SR Prohibit Indicator and not indicated by the Group SR Resume Indicator, or of which the GroupSR-prohibitTimer is running.

If the SR is triggered by the BSR, which is triggered by the data for a logical channel which belongs to the ProSe group 1, which is indicated by the Group SR Prohibit Indicator and not indicated by the Group SR Resume Indicator, or of which the GroupSR-prohibitTimer is running, the UE does not consider the SR is pending, or the UE does not instruct the physical layer to signal the SR on PUCCH, or the UE does not increment SR_COUNTER, or the UE does not start sr-ProhibitTimer.

If the SR is triggered by the BSR, which is not triggered by the data for a logical channel which belongs to the Group, which is indicated by the Group SR Prohibit Indicator and not indicated by the Group SR Resume Indicator, or of which the GroupSR-prohibitTimer is running, the UE instructs the physical layer to signal the SR on PUCCH.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
   configuring that the UE belongs to one or more Proximity-based Services (ProSe) groups respectively corresponding to one or more sets of sidelink logical channels between the UE and other UEs;
   transmitting, to a network, a list of the one or more ProSe groups to which the UE belongs;
   receiving, from the a network, a Scheduling Request (SR) prohibit indication indicating at least one of the one or more ProSe groups;
   triggering a sidelink Buffer Status Report (BSR) for a first ProSe group among the one or more ProSe groups when a sidelink BSR trigger condition for the first ProSe group is met; and
   triggering a SR for the first ProSe group when the sidelink BSR for the first ProSe group is triggered and the SR prohibit indication does not indicate the first ProSe group.

2. A communication apparatus adapted to carry out the method of claim 1.

3. The method according to claim 1, wherein the first ProSe group is defined as at least one of:
   a set of sidelink logical channels with a same target identified by a group identifier; or
   a set of sidelink logical channels with a same source identified by a source identifier and a same target identified by a destination identifier, or
   a set of sidelink logical channels with a group index which is mapped to a same group identifier.

4. A communication apparatus adapted to carry out the method of claim 3.

5. The method according to claim 1,
   wherein the list of the one or more ProSe groups to which the UE belongs includes a group identifier or a group index which identifies the first ProSe group.

6. A communication apparatus adapted to carry out the method of claim 5.

7. The method according to claim 1, wherein when the UE receives a SR prohibit indication indicating the first ProSe group,
   the UE considers that the triggered sidelink BSR for the first ProSe group does not trigger the SR for the first ProSe group; or
   the UE considers that the SR is not pending even though the SR is triggered and not cancelled when the SR is triggered by the sidelink BSR for the first ProSe group.

8. The method according to claim 1, wherein the SR is not triggered when the SR prohibit indication indicates the first ProSe group.

9. The method according to claim 1, further comprising:
   receiving, from the network, a SR resume indication indicating the first ProSe group;
   triggering the sidelink a BSR for the first ProSe group indicated by the SR resume indication when the sidelink BSR trigger condition for the first ProSe group is met; and
   triggering the SR for the first ProSe group.

10. A method for a User Equipment (UE) operating in a wireless communication system, the method comprising:
    configuring that the UE belongs to one or more Proximity-based Services (ProSe) groups respectively corresponding to one or more sets of sidelink logical channels between the UE and other UEs;
    transmitting, to a network, a list of the one or more ProSe groups to which the UE belongs;
    receiving, from the network, a Scheduling Request (SR) prohibit indication indicating at least one of the one or more ProSe group;
    starting a prohibit timer for each ProSe group indicated by the SR prohibit indication;
    triggering a sidelink Buffer Status Report (BSR) for a first ProSe group among the one or more ProSe groups when a sidelink BSR trigger condition for the first ProSe group is met; and
    triggering a SR for the first ProSe group when the sidelink BSR for the first ProSe group is triggered and a prohibit timer for the first ProSe group is not running.

11. A communication apparatus adapted to carry out the method of claim 10.

12. The method according to claim 10, wherein the SR is not triggered when the prohibit timer for the first ProSe group is running.

13. A communication apparatus adapted to carry out the method of claim 12.

14. The method according to claim 10, wherein the SR prohibit indication includes a group identifier or a group index which identifies the first ProSe group, and a value of the prohibit timer.

15. A communication apparatus adapted to carry out the method of claim 14.

16. The method according to claim 10, wherein the prohibit timer can be pre-defined for the UE and the network.

17. The method according to claim 10, wherein the prohibit timer is a period of time duration, wherein the period of time duration defines a number of subframes, a certain time duration, or a number of SR trigger.

18. The method according to claim 10, further comprising:
    receiving, from the network, a SR resume indication indicating the first ProSe group; and
    stopping the prohibit timer for the first ProSe group when the SR resume indication indicates that the first ProSe group is received.

19. The method according to claim 10, further comprising:
    when the prohibit timer expires and the sidelink BSR trigger condition for the first ProSe group is met, triggering the sidelink BSR for the first ProSe group.

20. The method according to claim 10, wherein when the prohibit timer expires and the SR for the first ProSe group is triggered by the sidelink BSR for the first ProSe group, the UE considers that the SR is pending until when the SR is canceled.

* * * * *